(12) United States Patent
Hirose

(10) Patent No.: US 11,705,809 B2
(45) Date of Patent: Jul. 18, 2023

(54) VOLTAGE CONVERTER

(71) Applicant: Murata Manufacturing Co., Ltd., Nagaokakyo (JP)

(72) Inventor: Shohei Hirose, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 17/573,687

(22) Filed: Jan. 12, 2022

(65) Prior Publication Data
US 2022/0278612 A1    Sep. 1, 2022

(30) Foreign Application Priority Data
Feb. 26, 2021    (JP) ................. 2021-030843

(51) Int. Cl.
H02M 1/00 (2006.01)
H02M 3/07 (2006.01)
H02M 3/158 (2006.01)

(52) U.S. Cl.
CPC ........... H02M 3/07 (2013.01); H02M 1/0009 (2021.05); H02M 3/158 (2013.01)

(58) Field of Classification Search
CPC ........ H02M 3/07; H02M 3/158; H02M 3/015; H02M 3/01; H02M 3/1586; H02M 1/0009; H02M 1/0054; H02M 1/0043; H02M 1/0095
See application file for complete search history.

(56) References Cited

U.S. PATENT DOCUMENTS

| | | | |
|---|---|---|---|
| 6,469,481 B1 | 10/2002 | Tateishi | |
| 7,652,458 B2 * | 1/2010 | Park | H02J 7/02 323/282 |
| 8,698,476 B2 * | 4/2014 | Chen | H02M 3/156 323/288 |
| 9,570,999 B2 * | 2/2017 | Yang | H02M 3/335 |
| 9,716,429 B2 * | 7/2017 | Liao | H02M 3/07 |
| 9,998,004 B2 * | 6/2018 | Sicard | H02M 1/08 |
| 10,720,833 B2 * | 7/2020 | Tsuda | H02M 3/073 |
| 10,756,627 B2 * | 8/2020 | Hsu | H02M 3/158 |
| 11,522,466 B1 * | 12/2022 | Li | H02M 3/1582 |
| 2019/0229623 A1 | 7/2019 | Tsuda et al. | |
| 2020/0119635 A1 | 4/2020 | Rahimi | |

FOREIGN PATENT DOCUMENTS

| | | |
|---|---|---|
| JP | 8-116679 A | 5/1996 |
| JP | 2000193687 A | 7/2000 |
| JP | 2002058240 A | 2/2002 |
| WO | 2018066444 A1 | 4/2018 |

OTHER PUBLICATIONS

First Office Action in JP2021-030843, dated May 9, 2023, 4 pages.

* cited by examiner

*Primary Examiner* — Sibin Chen
(74) *Attorney, Agent, or Firm* — Keating & Bennett, LLP

(57) ABSTRACT

A voltage converter includes a capacitive voltage conversion circuit, an output capacitor, an inductor, a current detector, and a controller. The capacitive voltage conversion circuit includes switches, at least one flying capacitor, and an intermediate capacitor at an output portion. The current detector detects a current flowing in the inductor. The controller controls the switches in the capacitive voltage conversion circuit to change between at least two states by comparing the current flowing in the inductor to a threshold current.

15 Claims, 20 Drawing Sheets

VOLTAGE CONVERTER

CROSS REFERENCE TO RELATED APPLICATIONS

This application claims the benefit of priority to Japanese Patent Application No. 2021-030843 filed on Feb. 26, 2021. The entire contents of this application are hereby incorporated herein by reference.

BACKGROUND OF THE INVENTION

1. Field of the Invention

The present invention relates to a voltage converter including a capacitive voltage conversion circuit.

2. Description of the Related Art

It is relatively easy to miniaturize a voltage converter including a capacitive voltage conversion circuit referred to as a switched capacitor circuit or a charge pump circuit, because such a voltage converter does not need any inductive element such as a transformer. Thus, this voltage converter is suitable for compact power supply devices for low power use.

There are various capacitive voltage conversion circuits configured in different manners. Typical examples include the Dickson type and the series-parallel type. Other examples include the ladder type and the Fibonacci type. A capacitor network circuit including a plurality of capacitors and a plurality of switches is controlled to changeably provide at least two kinds of connections so as to output a decreased or increased input voltage.

Japanese Unexamined Patent Application Publication No. 8-116679 describes a DC-AC converter (inverter) including a capacitive voltage converter. This DC-AC converter converts an inputted direct-current voltage into a sinusoidal alternating-current voltage by using resonance of an inductor and a capacitor and outputs the converted sinusoidal alternating-current voltage.

Losses based on the operating frequency are mainly composed of losses due to movement of electric charges in a capacitor and losses caused by activating switches. The former losses depend on the amount of load and frequency. The losses increase in proportion to the amount of load. The latter losses do not depend on load current. The losses are proportional to only frequency. As a result, in the case in which the load is absent or small, when the losses caused by activating switches are greater than the losses due to movement of electric charges in the capacitor, lowering the switching frequency is expected to improve the efficiency of voltage conversion.

A general charge pump does not include an inductor. The general charge pump includes a capacitor, and a switch or a diode. The current flowing in the circuit is thus determined by the parasitic resistance of the capacitor and wiring and the resistance of the switch, and as a result, the output current instantaneously increases to a relatively high peak value similarly to the current charging or discharging a capacitor.

When such a current with a significantly high peak value flows, detecting the current is difficult. Furthermore, it is difficult to suppress variations in the current peak value and variations in the time for charging and discharging. For these reasons, it is considerably difficult to control switching of the charge pump by detecting the current.

SUMMARY OF THE INVENTION

Preferred embodiments of the present invention provide voltage converters that are each able to control switching of a charge pump in accordance with a result of detecting a current, while lowering a peak value of the current to facilitate the current detection and reducing or preventing variations in the peak value of the current and variations in the time to charge and discharge.

A voltage converter according to a preferred embodiment of the present invention includes a capacitive voltage conversion circuit to receive an input voltage, convert the input voltage into an output voltage, and output the output voltage, an output capacitor, an inductor coupled in series between the capacitive voltage conversion circuit and the output capacitor, a current detector, and a controller. The capacitive voltage conversion circuit includes a plurality of switches, at least one flying capacitor, and an intermediate capacitor at an output portion. The current detector is configured to detect a current flowing in the inductor. The controller is configured or programmed to control the switches to change between at least two states by comparing the current flowing in the inductor to a threshold current.

According to each preferred embodiment of the present invention, it is possible to control switching of a charge pump in accordance with a result of detecting a current, while lowering the peak value of the current to facilitate the current detection and reducing or preventing variations in the peak value of the current and variations in the time to charge and discharge.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
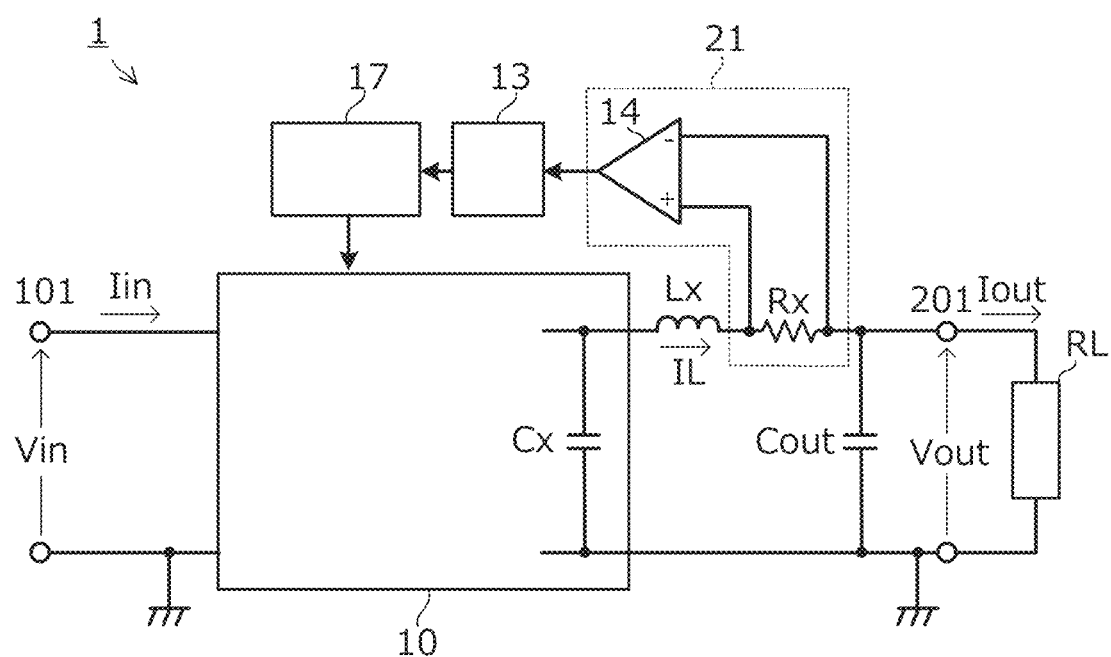
FIG. 1 is a block diagram of a voltage converter according to a first preferred embodiment of the present invention.

Preferred embodiments of the present invention are described by using specific examples with reference to the drawings. The same reference characters are used to denote the same or corresponding portions in the respective drawings. In consideration of simplicity of describing or understanding main points, for ease of description of preferred embodiments, the preferred embodiments will be individually described. However, the configurations described in the different preferred embodiments may be partially replaced or combined with each other. In second and subsequent preferred embodiments, descriptions about features and elements common to a first preferred embodiment of the present invention are not repeated and only different points will be explained. In particular, the same or substantially the same effects and advantages achieved by the same or substantially the same configurations are not described in every preferred embodiment.

First Preferred Embodiment

FIG. 1 is a block diagram of a voltage converter 1 according to a first preferred embodiment of the present invention. The voltage converter 1 includes a capacitive voltage conversion circuit 10 configured to receive an input voltage Vin, convert the input voltage Vin into an output voltage Vout, and output the output voltage Vout. The voltage converter 1 also includes an output capacitor Cout, an inductor Lx coupled in series between the capacitive voltage conversion circuit 10 and the output capacitor Cout, an intermediate capacitor Cx provided at an output portion of the capacitive voltage conversion circuit 10, a current detector 21, a voltage detector 13, and a controller 17.

The current detector 21 includes a resistor Rx and a differential amplifier circuit 14. The current detector 21 detects a current flowing in the inductor Lx. The output capacitor Cout corresponds to an "output capacitor." The inductor Lx corresponds to an "inductor".

The voltage converter 1 lowers the input voltage Vin from an input power supply coupled to an input terminal 101 to the output voltage Vout and supplies the output voltage Vout to a load RL. An input current Iin is inputted to the voltage converter 1, and an output current Iout is outputted to the load RL.

The voltage detector 13 detects the output voltage from the differential amplifier circuit 14. When the output voltage from the voltage detector 13 exceeds a threshold as a result of comparison, the controller 17 changes the state of switches in the capacitive voltage conversion circuit 10. Specifically, the controller 17 controls the switches to change between at least two states by comparing the current flowing in the inductor Lx to the threshold current.

Figure 2:
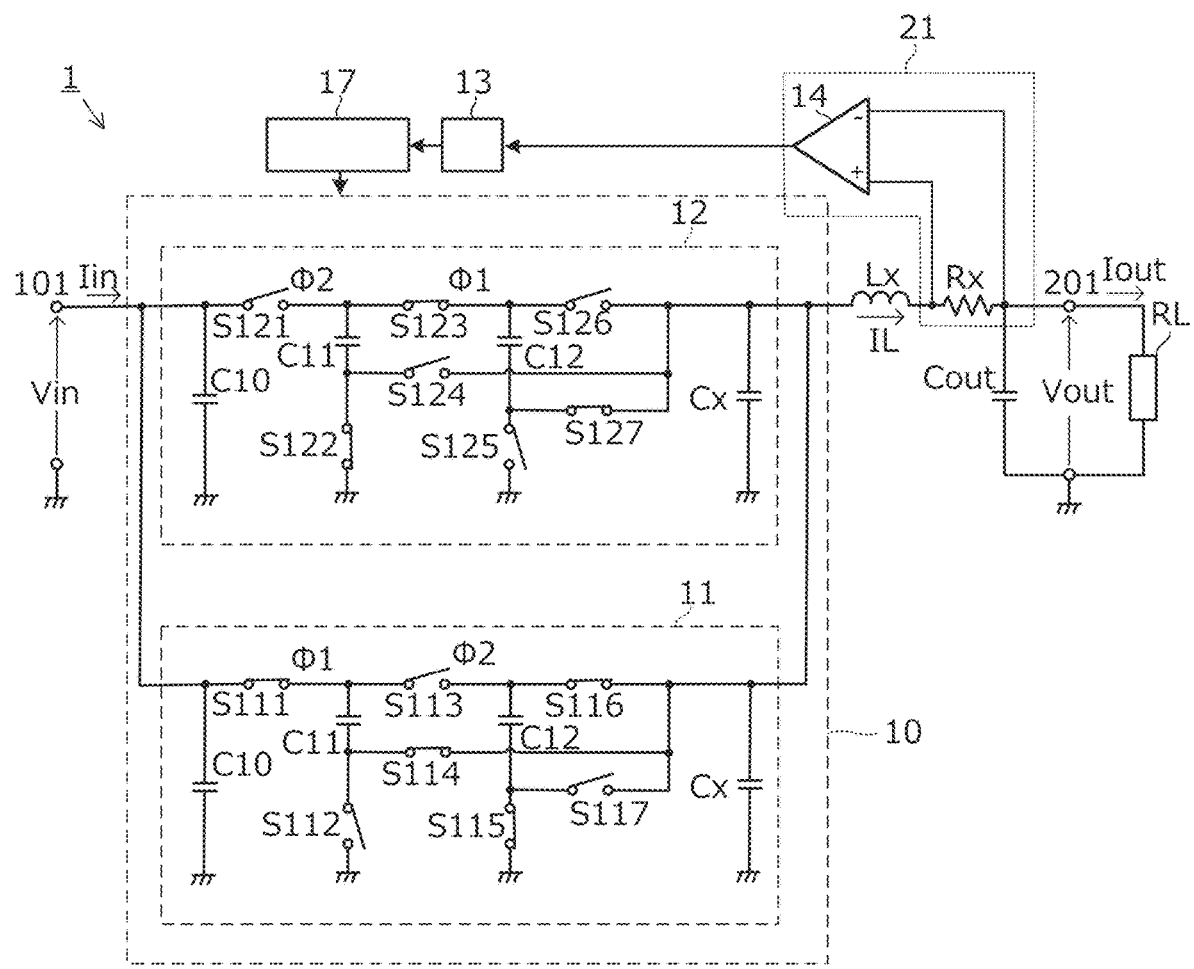
FIG. 2 illustrates an example of a circuit diagram of the voltage converter illustrated in FIG. 1.

FIG. 2 illustrates an example of a circuit diagram of the voltage converter 1. The capacitive voltage conversion circuit 10 includes a first capacitive voltage conversion circuit 11 and a second capacitive voltage conversion circuit 12 that are coupled in parallel with each other. The first capacitive voltage conversion circuit 11 and the second capacitive voltage conversion circuit 12 are both configured in the same or substantially the same manner. A plurality of flying capacitors C10, C11, and C12, the intermediate capacitor Cx, and a plurality of switches S111, S112, S113, S114, S115, S116, and S117 are disposed in the first capacitive voltage conversion circuit 11. The plurality of flying capacitors C10, C11, and C12, the intermediate capacitor Cx, and a plurality of switches S121, S122, S123, S124, S125, S126, and S127 are disposed in the second capacitive voltage conversion circuit 12.

The capacitive voltage conversion circuit 10 is provided by mounting devices such as integrated circuits and chip components on, for example, a circuit board. The inductor Lx and the output capacitor Cout are, for example, individual chip components separately mounted at the circuit board. The flying capacitors C10, C11, and C12, the intermediate capacitor Cx, and the output capacitor Cout are, for example, ceramic capacitors mounted at the circuit board. With this configuration, the area of a mounting surface can be easily reduced by using high-capacity ceramic capacitors.

The controller 17 controls the first capacitive voltage conversion circuit 11 and the second capacitive voltage conversion circuit 12 in an interleaved manner. As in the example illustrated in FIG. 2, when the switches S111, S114, S115, S116, S122, S123, and S127 are ON, and the switches S112, S113, S117, S121, S124, S125, and S126 are OFF, this state is referred to as a first connection state Φ1. When the switches S111, S114, S115, S116, S122, S123, and S127 are OFF, and the switches S112, S113, S117, S121, S124, S125, and S126 are ON, this state is referred to as a second connection state Φ2.

Additionally, the state in which all of the switches are OFF may be used as a third connection state to avoid undesirable power consumption caused by unnecessary current such as through current. This third state may be used as an intermediate state when the first connection state is changed to the second connection state or when the second connection state is changed to the first connection state. The present preferred embodiment does not describe the third connection state for ease of description.

Figure 3A:
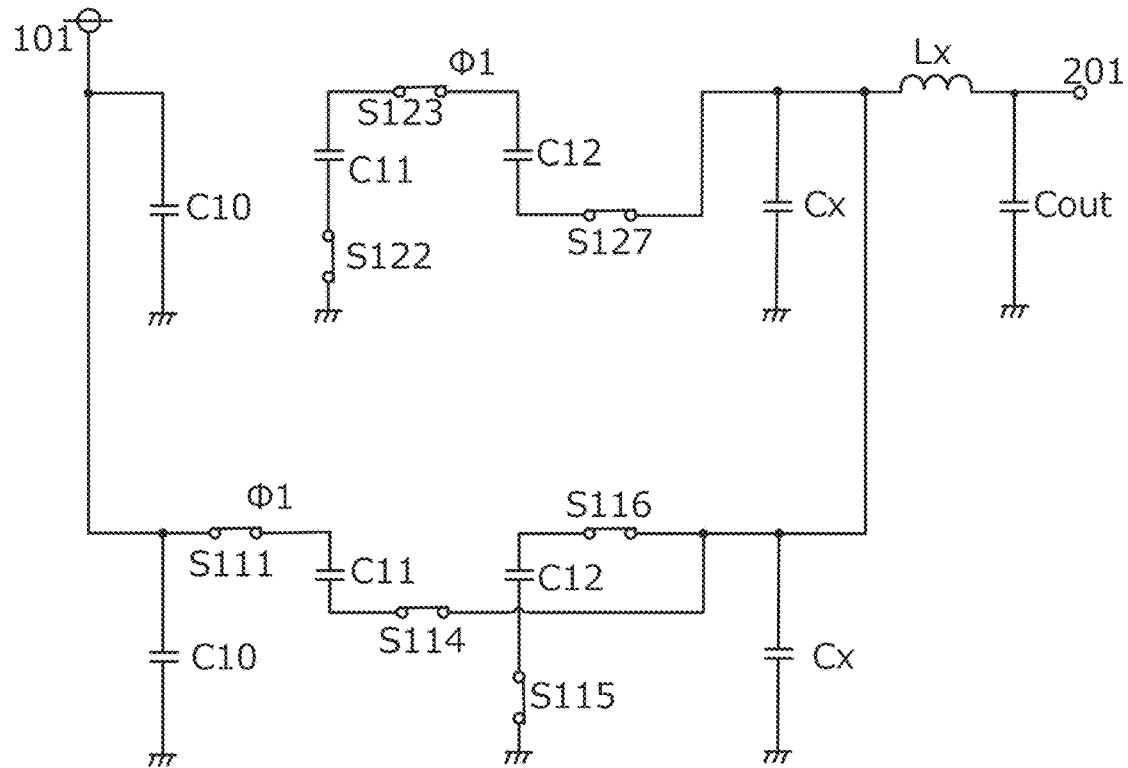
FIG. 3A is a circuit diagram when the circuit illustrated in FIG. 2 is in a first connection state.

FIG. 3A is a circuit diagram when the circuit illustrated in FIG. 2 is in the first connection state Φ1.

Figure 3B:
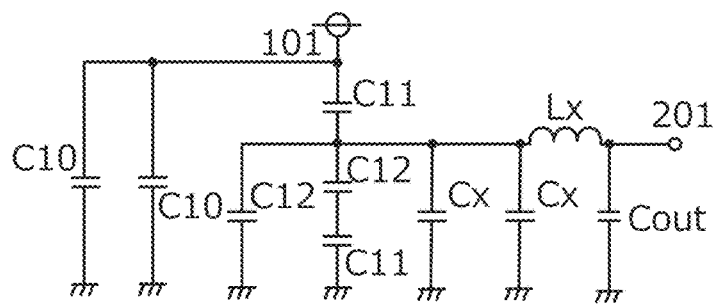
FIG. 3B is a circuit diagram when the impedance of a power supply is relatively high in the circuit illustrated in FIG. 3A, and the following expression is not satisfied: C10>>C11.

FIG. 3B is a circuit diagram when the impedance of the power supply is relatively high (the impedance of the power supply is a considerable value) in the circuit illustrated in FIG. 3A, and the following expression is not satisfied: C10»C11, where C10 is the capacitance of the capacitor C10, and C11 is the capacitance of the capacitor C11.

Figure 3C:
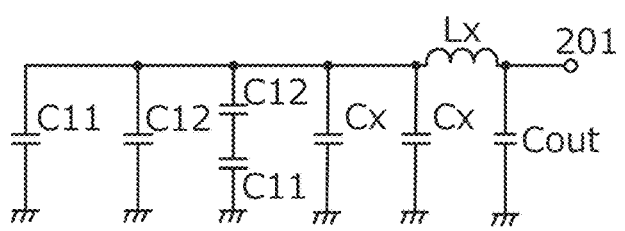
FIG. 3C is a circuit diagram when the impedance of the power supply in the circuit illustrated in FIG. 3A is sufficiently low.

FIG. 3C is a circuit diagram when the impedance of the power supply in the circuit illustrated in FIG. 3A is sufficiently low. FIG. 3C is also a circuit diagram when the capacitance of the capacitor C10 is sufficiently larger than the capacitance of the capacitor C11 (C10»C11). This means that, although the impedance of the power supply is a considerable value, when C10»C11, the capacitor C10 substantially hides the impedance of the power supply. This state is equivalently shown as the circuit illustrated in FIG. 3C.

It should be noted that an on-resistance RON of each switch is negligibly small in FIGS. 3B and 3C.

Figure 4:
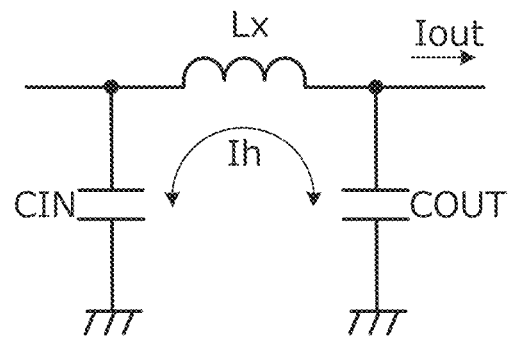
FIG. 4 is a circuit diagram shown in a combined manner based on the circuit illustrated in FIG. 3B or 3C.

FIG. 4 is a circuit diagram shown in a combined manner based on the circuit illustrated in FIG. 3B or 3C. As illustrated in FIG. 4, the capacitive voltage conversion circuit 10 and an LC circuit 20 which are illustrated in FIG. 1, together define an LC resonant circuit in which a composite capacitor CIN is disposed at an input end of the inductor Lx, and a capacitor COUT provided mainly by the capacitor Cout is disposed at an output end of the inductor Lx. A resonant current Ih flows in this LC resonant circuit.

When the impedance of the power supply is relatively high, and the capacitance of the capacitor C10 is relatively small (C10>>C11 is not satisfied), in other words, in the case equivalently illustrated in FIG. 3B, a capacitance Cin of the composite capacitor CIN is provided by the following expression:

$$Cin = C13 + C13 + \frac{1}{\left(\frac{1}{C12} + \frac{1}{C11}\right)} + C12 + \frac{1}{\left(\frac{1}{C11} + \frac{1}{(C10+C10)}\right)}$$ (Expression 1)

When the power supply is ideal with a sufficiently low impedance, or when the impedance of the power supply is a considerable value, but C10»C11, in other words, in the case of the equivalent circuit illustrated in FIG. 3C, the capacitance Cin of the composite capacitor CIN is provided by the following expression:

$$Fs = \frac{1}{2\pi\sqrt{L\left(\frac{Cin*Cout}{Cin+Cout}\right)}}.$$ (Expression 3)

A resonant frequency Fh of the resonance circuit illustrated in FIG. 4 is provided by the following expression:

$$Cin = C13 + C13 + \frac{1}{\left(\frac{1}{C12} + \frac{1}{C11}\right)} + C12 + C11.$$ (Expression 2)

The detection value detected by the current detector 21 or the threshold current is determined to set a switching frequency within the range of a minimum frequency to a maximum frequency. The switching frequency of the switches is generated when the switches are changed between at least two states by comparing the current flowing in the inductor Lx to the threshold current. The controller 17 thus controls the switch by using a frequency determined by conditions including the maximum frequency and the minimum frequency.

The minimum frequency is set to be lower than a resonant frequency determined by at least one flying capacitor, the intermediate capacitor Cx, the inductor Lx, and the output capacitor Cout.

The maximum frequency is set to be higher than the resonant frequency determined by at least one flying capacitor, the intermediate capacitor Cx, the inductor Lx, and the output capacitor Cout.

The minimum frequency and the maximum frequency are determined by controlling the detection value of the current flowing in the inductor Lx or the threshold current. For example, as the threshold current decreases, the time taken until the current flowing in the inductor Lx exceeds the threshold current shortens, and thus, as the threshold current decreases, the switching frequency increases. In contrast, as the threshold current increases, the switching frequency decreases. As such, the switching frequency changes in response to the setting of the threshold current, and thus, the minimum frequency and the maximum frequency of the switching frequency can be determined by controlling the threshold current. Similarly, as a DC bias value added to the detection value of the current flowing in the inductor Lx increases, the time taken until the current flowing in the inductor Lx exceeds the threshold current shortens, and thus, as the DC bias value increases, the switching frequency increases. Conversely, as the DC bias value added to the detection value of the current flowing in the inductor Lx decreases, the switching frequency decreases.

In the present preferred embodiment, the threshold current is set to less than 0. This makes the switching frequency lower than the resonant frequency. As a result, when the load is absent or in a small amount, losses caused by activating the switches decrease, and the efficiency of voltage conversion increases.

In consideration of simplicity of understanding, the first capacitive voltage conversion circuit 11 and the second capacitive voltage conversion circuit 12 are described as individual circuits, but parallelly coupled capacitors (capacitors coupled in a duplicated manner) may be provided as a single capacitor. For example, the capacitors C10 and C10 and the capacitors Cx and Cx can both be provided as single capacitors. The same is true for the switches. The switches provided in a duplicated manner can be configured as a common switch. These configurations can reduce the number of components.

Figure 5:
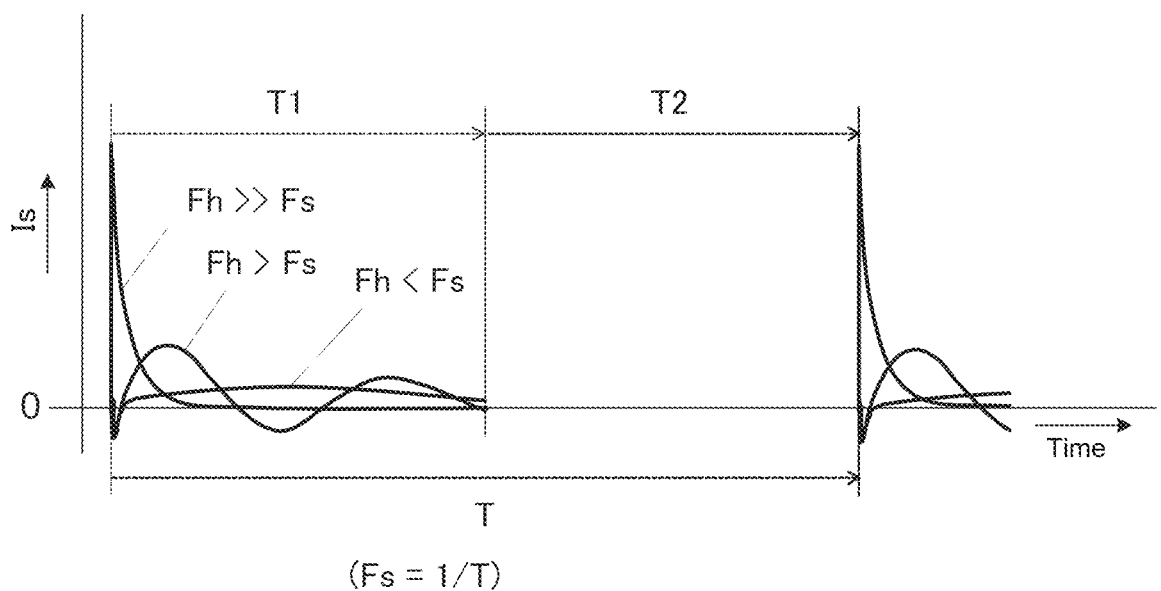
FIG. 5 is a waveform diagram illustrating plots of switching current versus switching period in relation to resonant frequency in the voltage converter.

FIG. 5 is a waveform diagram illustrating plots of a switching current Is versus a switching period T in relation to the resonant frequency Fh in the voltage converter 1. Here, the switching period T is the total of a period T1 of the first connection state Φ1 and a period T2 of the second connection state Φ2.

A switching frequency Fs is the inverse of the switching period T. Without consideration for times including blank times during which all of the switches are turned off, T=T1+T2, thus Fs=1/T. For ease of description, the following description is provided under this condition. The waveforms of the switching current Is in FIG. 5 simulate waveforms of the current flowing in the switch S111. Here, the direction to the output is indicated as positive.

When electric power is transmitted from the capacitive voltage conversion circuit 10 to the capacitive or resistive load RL, the resonant frequency Fh is considerably higher than the switching frequency Fs (Fh>>Fs). Thus, as illustrated in FIG. 5, a large amount of peak current flows, and this increases losses. When the inductor Lx is coupled to an output terminal 201 side, an inductive property appears. Accordingly, the resonant frequency Fh is slightly higher than the switching frequency Fs (Fh>Fs), and as illustrated in FIG. 5, the switching current Is has negative values in a given period. When the inductance of the inductor Lx increases, the resonant frequency Fh is lower than the switching frequency Fs (Fh<Fs), and as illustrated in FIG. 5, the switching current Is does not have negative values in any period and remains at very small values.

When the average output current is relatively large, and the conductor losses caused by flowing current are equal to or more than the total of switching losses and losses caused by activating switches, in other words, when the load is relatively is a large amount, the output current from the capacitive voltage conversion circuit 10 is the total of currents flowing in the switches, and the output current is determined by the average of the total of the currents. Concerning the three conditions illustrated in FIG. 5, when the total output current of the voltage converter 1 is Iout, the average current of each waveform indicating the current in the switch S111 is one-third of Iout. Thus, when the current waveform in FIG. 5 has negative values, in other words, when the current flows in the reverse direction, it is necessary to supply as compensation the same amount of current in the forward direction for the period T1 of the first connection state Φ1. As a result, the absolute value of the current flowing in the switch increases, and the heat loss at the switch increases, resulting in decreased efficiency.

This means that losses caused by a large amount of load can be reduced by setting the switching frequency Fs to be higher than the resonant frequency Fh.

In contrast, when the conductor losses are equal to or less than the total of switching losses and losses caused by activating switches, in other words, when the load is absent or in a small amount, the switching losses and the losses caused by activating switches are dominant losses, and thus, it is expected to improve the efficiency by setting the switching frequency Fs to be lower than the resonant frequency Fh.

Figure 6:
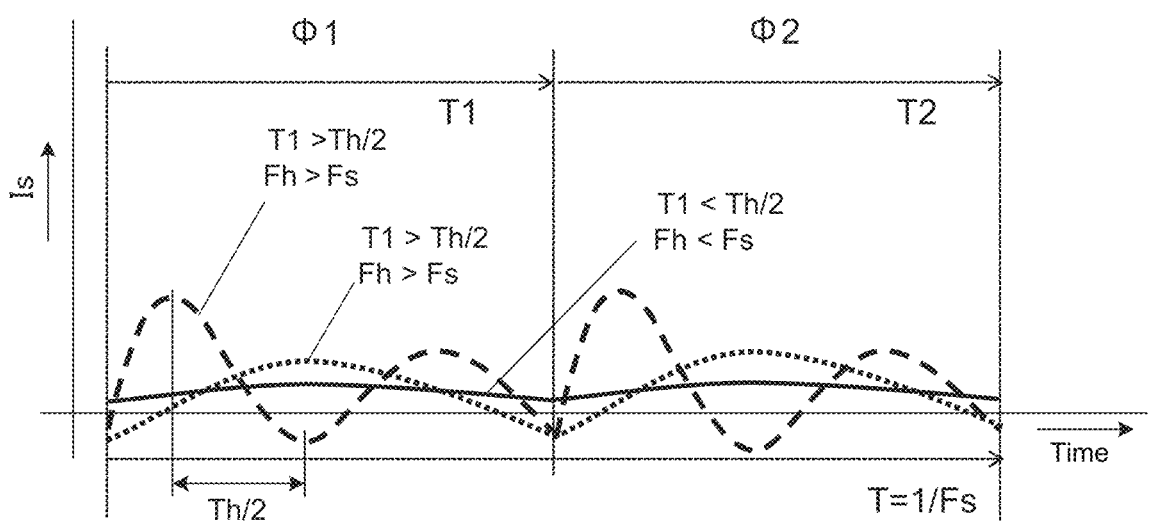
FIG. 6 is a waveform diagram illustrating plots of switching current versus switching period in relation to resonant frequency in the voltage converter.

With the circuit configuration according to the present preferred embodiment, the current caused by LC resonance can be effectively observed by measuring the current flowing in the inductor. Examples of waveforms are illustrated in FIG. 6. In FIG. 6, the average current value of each waveform is equal to the output current of the voltage converter. The waveforms have different shapes and peak values in relation to the resonant frequency Fh and the switching frequency Fs, similarly to FIG. 5.

In particular, under the condition that the period T1 of the first connection state Φ1 is larger than half of a resonance period Th that is the inverse of the resonant frequency Fh (Th/2), that is, T1>Th/2, the current flows in the reverse direction for a given period. Because the present configuration has the two connection states for transmitting electric power, the following condition should be satisfied: the period T1 of the first connection state Φ1 is smaller than half of the resonance period Th that is the inverse of the resonant frequency Fh (Th/2), that is, T1<Th/2. The following condition should also be satisfied: the period T2 of the second connection state Φ2 is smaller than half of the resonance period Th that is the inverse of the resonant frequency Fh (Th/2), that is, T2<Th/2. Disconnected states including dead times are omitted from consideration.

As described above, when the resonant frequency Fh is higher than the switching frequency Fs, in other words, when the load is a relatively large amount, the current flowing in the reverse direction and the current flowing in the forward direction increase the amount of current passing the switch, and losses increase. A heat loss PLS of the switch is obtained by multiplying the on-resistance RON of the switch by the square of the current Is flowing in the switch and then calculating an integral with respect to time. This means that simply using, for example, a filter to decrease the peak of current does not solve the problem. If an inductor is provided or if parasitic inductance occurs, losses may increase. The efficiency of voltage conversion can be improved by appropriately controlling the on-time of the switch in accordance with calculation of the resonant frequency Fh according to the present preferred embodiment.

Thus, in the present preferred embodiment, the controller 17 is configured to provide switching by using the switching frequency Fs equal to or higher than the resonant frequency Fh determined by the capacitance of the capacitive voltage conversion circuit 10, the capacitance of the output capacitor Cout, and the inductance of the inductor Lx. In other words, switching is provided by using a switching period in which an on-period TN is equal to or shorter than half of the resonance period Th, that is, Th/2. Here, N is an integer indicating a connection state of a capacitive voltage conversion circuit, in this example, TN is T1 or T2.

When the switching frequency Fs is lower than the resonant frequency Fh, in other words, the load is a relatively large amount, because current flows in the reverse direction, the same or substantially the same amount of current flows in the forward direction. Consequently, the efficiency of voltage conversion is decreased. When the switching frequency Fs is equal to or higher than the resonant frequency Fh, no current flows in the reverse direction, and the efficiency of voltage conversion is improved. If this is also described with respect to time, it can be said that, when the switching period T is shorter than half of the resonance period Th, the efficiency is improved to the maximum extent.

Figure 7A:
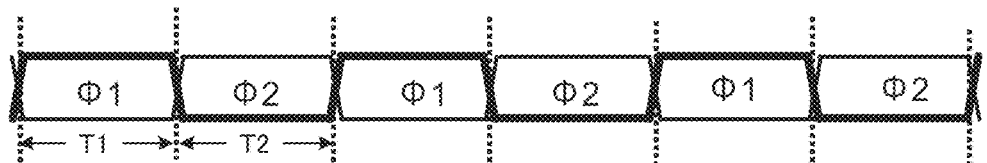
FIGS. 7A to 7E are timing charts illustrating examples of the relationship between the period of the first connection state and the period of a second connection state in the voltage converter.
Figure 7B:
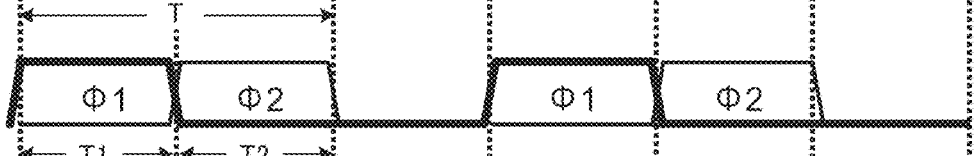
Figure 7C:
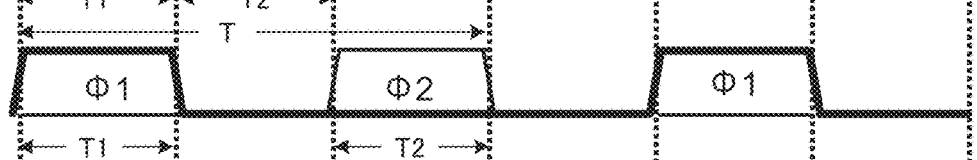
Figure 7D:
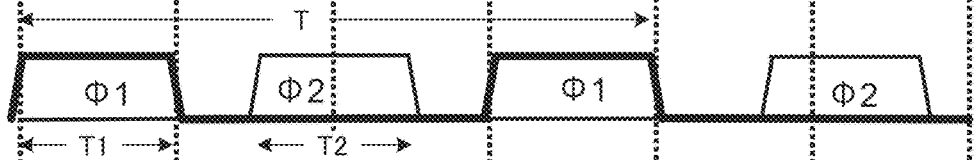

FIGS. 7A to 7E are timing charts illustrating examples of the relationship between the period of the first connection state Φ1 and the period of the second connection state Φ2 in the voltage converter 1. FIG. 7A indicates an example in which the period of the first connection state Φ1 is equal to the period of the second connection state Φ2, and the switching period T is equal to the total of the period T1 of the first connection state Φ1 and the period T2 of the second connection state Φ2. This means that the duty ratio for switching is about 0.5. In this case, the switching frequency Fs is higher than the resonant frequency Fh. As illustrated in FIGS. 7B to 7D, by inserting blank times such as dead times, the on-duty can be set to a value less than about 50%. In this case, as described above, the switching period T is shorter than half of the resonance period Th.

In the case in which the average output current is a relatively small amount (in other words, when the load is relatively light), if the switching frequency Fs is higher than the resonant frequency Fh, the following expression may be satisfied: (switching losses+losses caused by activating switches)≥conduction losses. Thus, by lowering the switching frequency, losses relating to activation of switches are reduced, and as a result, the efficiency is improved. Also in such a case, it is important to maintain the above-described relationship between the switching period and the resonance period.

Figure 7E:
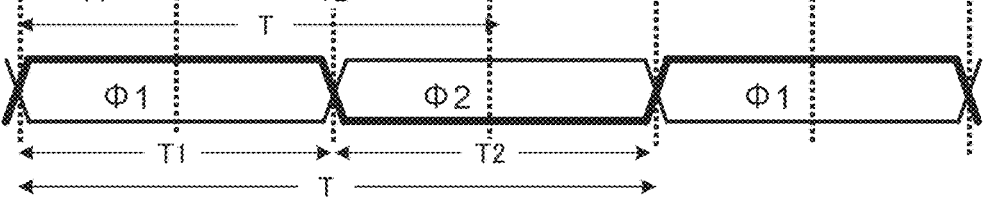

Another method other than the method described above is to extend the switching period while maintaining the approximately 0.5 duty ratio by extending both the period of the first connection state Φ1 and the period of the second connection state Φ2, as illustrated in FIG. 7E. This control method can be used within the range in which the relationship between the switching frequency Fs and the resonant frequency Fh is maintained.

Figure 8:
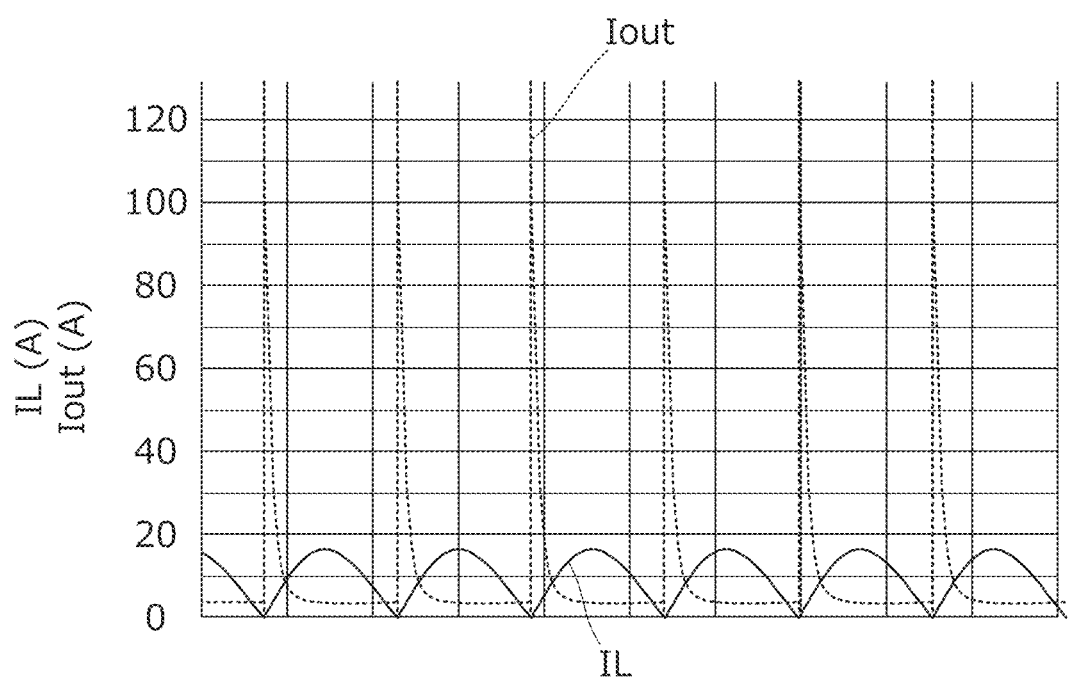
FIG. 8 is a waveform diagram of a current in an inductor in the voltage converter and a waveform diagram of the total output current in the voltage converter in the case without the inductor as a comparison target.

In FIG. 8, a current IL indicates a waveform of the current flowing in the inductor Lx, and the current Iout indicates a waveform of the total output current in the case without the inductor Lx.

In the case without the inductor Lx, the ripple of the current Iout is significantly large. Thus, if switching is provided by comparing the output current Iout used as feedback information to the threshold current, stable feedback operation cannot be performed.

In contrast, the ripple of a current IL flowing in the inductor Lx is relatively small in the present preferred embodiment. As a result, when switching is provided by comparing the current IL used as feedback information to the threshold current, very stable feedback operation can be performed.

Figure 9:
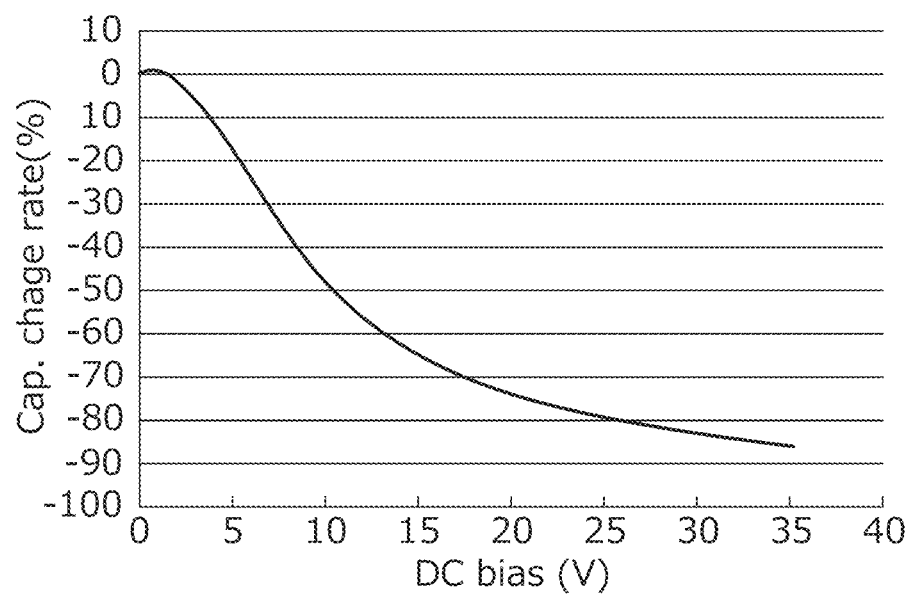
FIG. 9 illustrates a plot of capacitance charge rate versus DC bias in a ceramic capacitor.

FIG. 9 illustrates a plot of capacitance charge rate versus DC bias in the ceramic capacitor. The capacitance of the flying capacitor provided by the ceramic capacitor greatly varies in response to the applied voltage. As such, the voltage applied to the flying capacitor varies in response to the input voltage. However, as indicated by Expression 3, the resonant frequency changes in accordance with the capacitance of the resonance circuit. For this reason, when the applied voltage changes, it is considerably difficult to maintain the switching frequency at a fixed frequency close to the resonant frequency.

The magnitude of amplitude of the current IL flowing in the inductor Lx is proportional to the load current. When the load current decreases by a predetermined value, the current IL is increased by feedback control. As the load current increases, the time taken to decrease the current IL shortens, and as a result, the speed to increase the output voltage Vout increases. This means that the switching frequency increases. Conversely, as the load current decreases, the switching frequency decreases.

The controller 17 illustrated in FIG. 1 provides switching of the switch by using a frequency determined by conditions including the maximum frequency and the minimum frequency of the switching frequency. The minimum frequency is set to be lower than a resonant frequency determined by at least one flying capacitor, the intermediate capacitor Cx, the inductor Lx, and the output capacitor Cout. This configuration reduces, for example, the occurrence of audible noise (acoustic noise) due to switching by using an audio frequency.

The controller 17 illustrated in FIG. 1 provides switching of the switch by using a frequency determined by conditions including the maximum frequency and the minimum frequency of the switching frequency. The maximum frequency is set to be higher than a resonant frequency determined by at least one flying capacitor, the intermediate capacitor Cx, the inductor Lx, and the output capacitor Cout. This configuration can prevent the switching frequency from being set outside of the frequency range in which the switch is operable. This means that switching can always be provided within the frequency range in which the switch is operable.

Figure 10A:
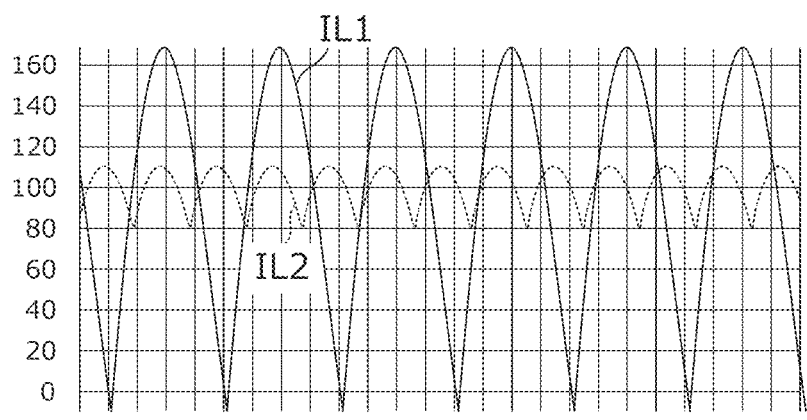
FIGS. 10A to 10D are waveform diagrams illustrating the current flowing in the inductor at two switching frequencies.
Figure 10B:
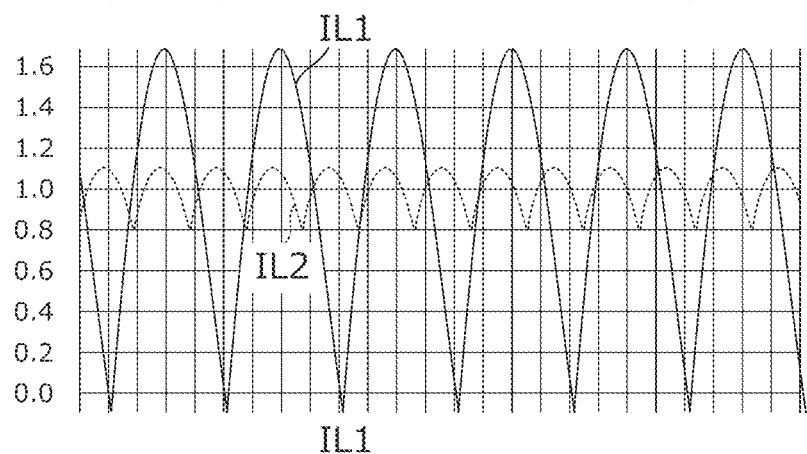
Figure 10C:
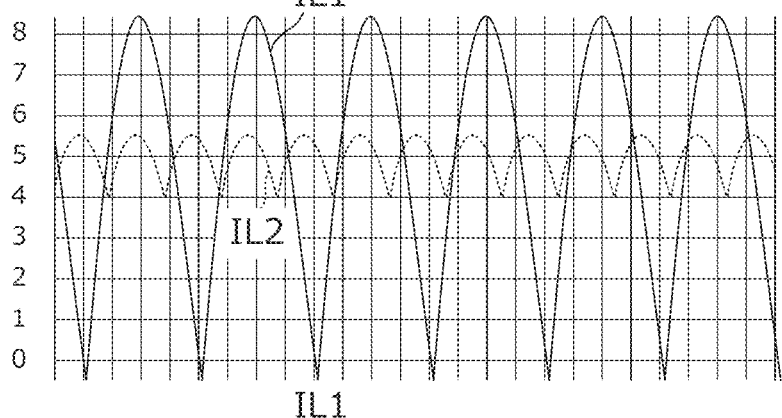
Figure 10D:
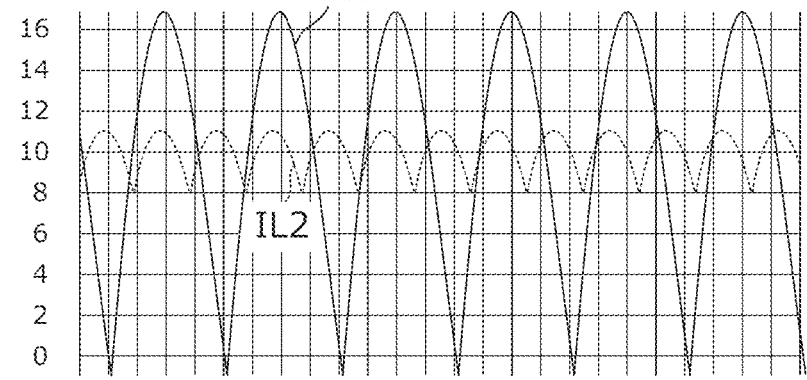

FIGS. 10A to 10D are waveform diagrams illustrating the current IL flowing in the inductor Lx at two switching frequencies. FIG. 10A is a waveform diagram when the current IL flowing in the inductor Lx=about 0.1 A. FIG. 10B is a waveform diagram when IL=about 1 A. FIG. 10C is a waveform diagram when IL=about 5 A. FIG. 10D is a waveform diagram when IL=about 10 A.

In FIGS. 10A to 10D, the current IL1 indicates a waveform of the current IL flowing in the inductor Lx when the switching frequency Fs is about twice the resonant frequency Fh. The current IL2 indicates a waveform of the current IL flowing in the inductor Lx when Fs=1/(Fh*(100%+1%*1)), in other words, the current IL2 indicates a waveform of the current IL flowing in the inductor Lx in the case in which switching is provided when the current flowing in the inductor Lx falls below 0 and further decreases by about 1% of the resonance period.

Figure 11A:
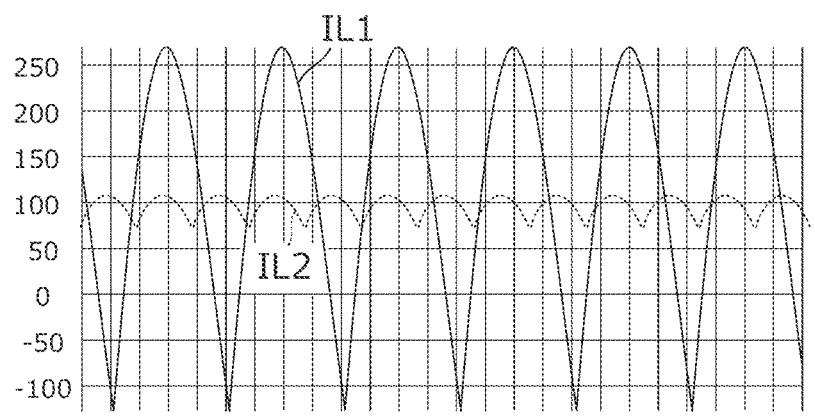
FIGS. 11A to 11D are waveform diagrams illustrating the current flowing in the inductor at two switching frequencies.
Figure 11B:
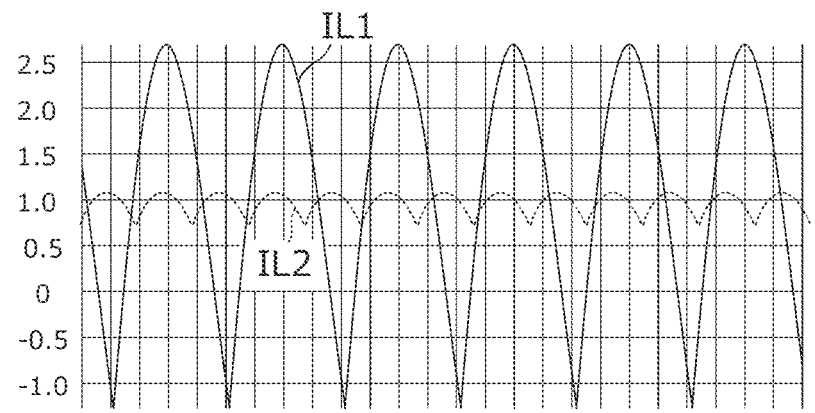
Figure 11C:
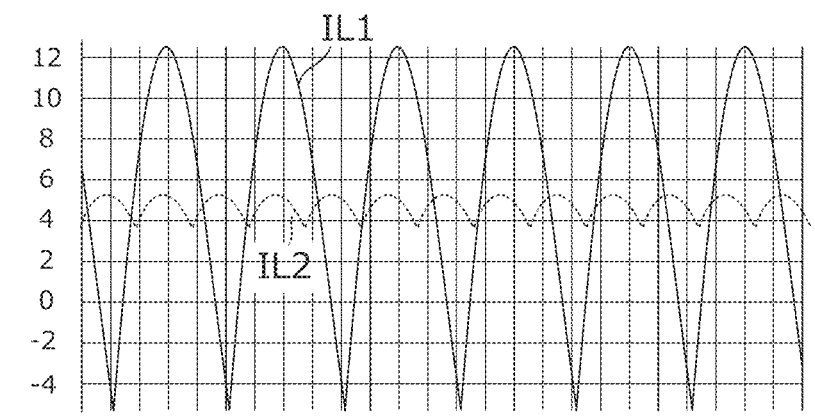
Figure 11D:
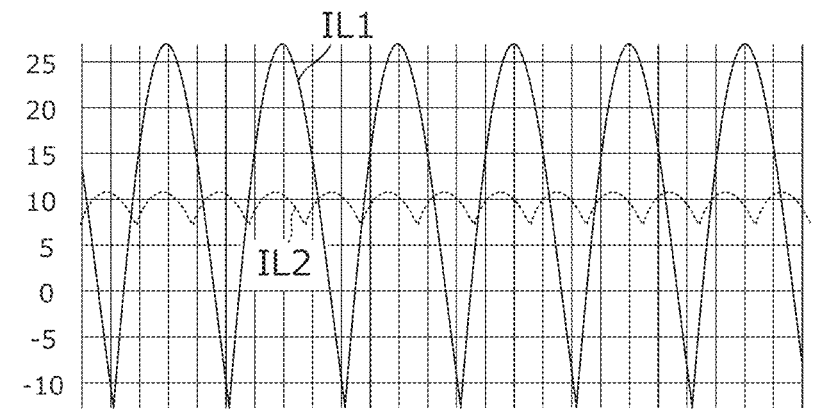

FIGS. 11A to 11D are waveform diagrams illustrating the current IL flowing in the inductor Lx at two switching frequencies. FIG. 11A is a waveform diagram when the current IL flowing in the inductor Lx=about 0.1 A. FIG. 11B is a waveform diagram when IL=about 1 A. FIG. 11C is a waveform diagram when IL=about 5 A. FIG. 11D is a waveform diagram when IL=about 10 A.

In FIGS. 11A to 11D, the current IL1 indicates a waveform of the current IL flowing in the inductor Lx when the switching frequency Fs is about twice the resonant frequency Fh. The current IL2 indicates a waveform of the current IL flowing in the inductor Lx when Fs=1/(Fh*(100%+1%*15)), in other words, the current IL2 indicates a waveform of the current IL flowing in the inductor Lx in the case in which switching is provided when the current flowing in the inductor Lx falls below 0 and then decreases by about 15% of the resonance period.

As illustrated in FIGS. 10A to 10D and 11A to 11D, when the switching frequency Fs is relatively high (twice the resonant frequency Fh), the effective value of the current IL flowing in the inductor Lx is relatively low.

As illustrated in FIGS. 10A to 10D, in the case in which switching is provided when the current IL flowing in the inductor Lx falls below 0 and about 1% of the resonance period elapses since, in other words, when the period after the current IL falls below 0 is relatively short, the effective value of the current IL flowing in the inductor Lx is relatively small. As illustrated in FIGS. 11A to 11D, in the case in which switching is provided when the current IL flowing in the inductor Lx falls below 0 and about 15% of the resonance period elapses since, in other words, when the period after the current IL falls below 0 is relatively long, the effective value of the current IL flowing in the inductor Lx is relatively large.

As indicated in FIGS. 10A to 10D and 11A to 11D, it is preferable, for example, that the current IL flowing in the inductor Lx is within the range of about 0.1 A to about 5 A.

FIGS. 12, 13, 14, and 15 illustrate the total loss of the voltage converter including the capacitive voltage conversion circuit in relation to the switching frequency Fs and the resonant frequency Fh. In these graphs, the horizontal axis indicates Fs/Fh, and the vertical axis indicates the total loss of the voltage converter including the capacitive voltage conversion circuit. FIGS. 12, 13, 14, and 15 use different scales in the vertical axis and thus indicate relative values.

Figure 12:
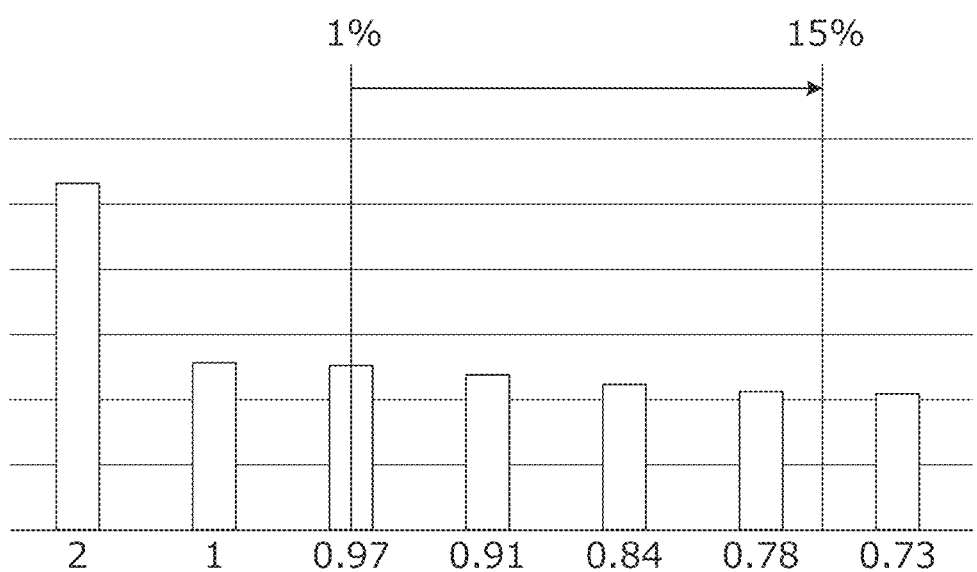
FIG. 12 illustrates the amount of loss with respect to the relationship between switching frequency and resonant frequency when the current flowing in the inductor is about 0.1 A.
Figure 13:
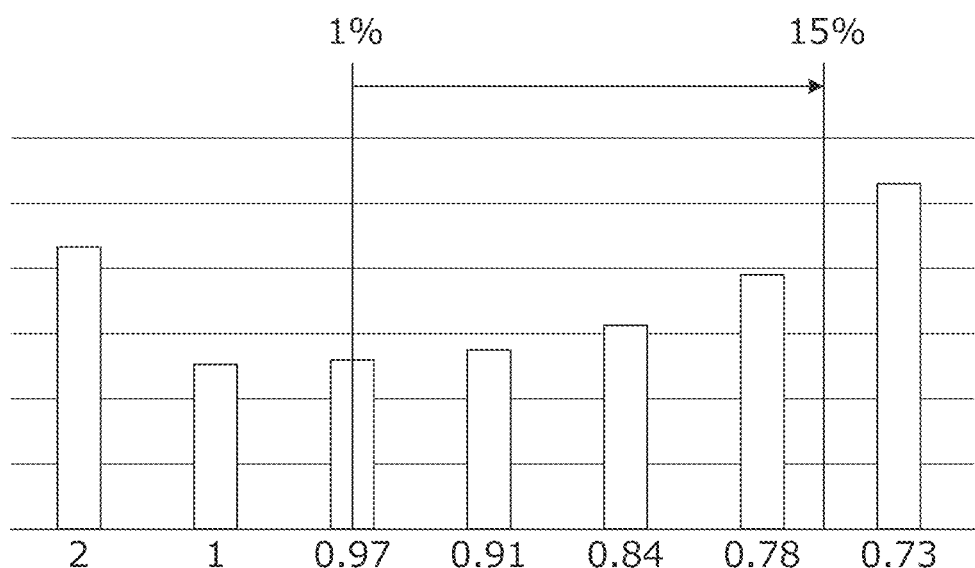
FIG. 13 illustrates the amount of loss with respect to the relationship between switching frequency and resonant frequency when the current flowing in the inductor is about 1 A.
Figure 14:
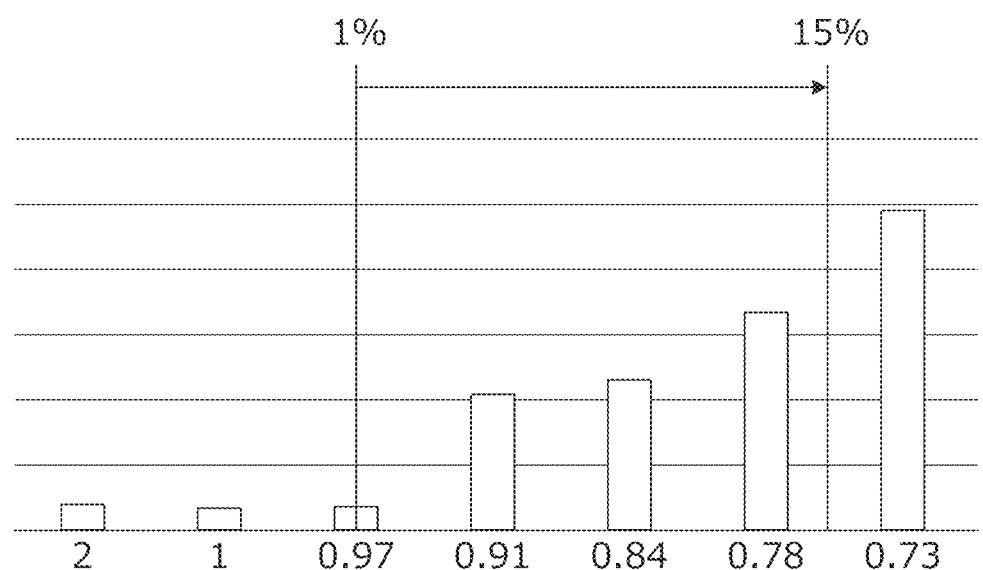
FIG. 14 illustrates the amount of loss with respect to the relationship between switching frequency and resonant frequency when the current flowing in the inductor is about 5 A.
Figure 15:
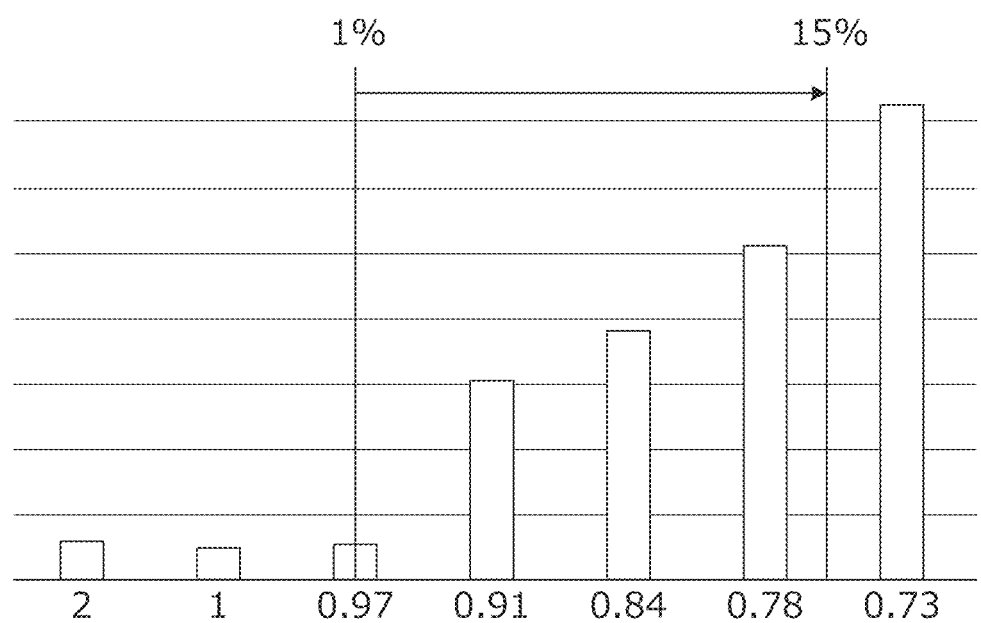
FIG. 15 illustrates the amount of loss with respect to the relationship between switching frequency and resonant frequency when the current flowing in the inductor is about 10 A.

FIG. 12 illustrates a characteristic when the current IL flowing in the inductor Lx is about 0.1 A. FIG. 13 illustrates a characteristic when the current IL flowing in the inductor Lx is about 1 A. FIG. 14 illustrates a characteristic when the current IL flowing in the inductor Lx is about 5 A. FIG. 15 illustrates a characteristic when the current IL flowing in the inductor Lx is about 10 A.

As illustrated in FIG. 12, when the load is absent or in a small amount, in other words, switching losses and losses caused by activating switches, which depend on the switching frequency, are relatively large, the loss is relatively low in a region of low switching frequencies. As illustrated in FIG. 13, when the load is in a small amount, and losses depending on the switching frequency are relatively large, in the case in which the ratio of conductor loss is high, the loss is relatively low in a region close to the resonant frequency. As illustrated in FIGS. 14 and 15, when the load is relatively large in amount, and the ratio of conductor loss is high, the conductor loss is relatively large in a region far from the resonant frequency.

As described above, by setting the switching frequency to be close to the resonant frequency, the current flowing in the inductor Lx increases. As a result, it is possible to improve the efficiency when the load is small in amount and maintain the loss when the load is relatively large in amount.

Further, as illustrated in FIGS. 14 and 15, when the current IL flowing in the inductor Lx exceeds about 5 A, the conductor loss is a dominant loss of the total loss. Thus, the improvement of efficiency can be expected in the region including about 5 A and lower currents. When the current IL flowing in the inductor Lx is less than about 0.1 A, the absolute value of the current IL flowing in the inductor Lx is relatively small, and measuring is thus relatively difficult.

Second Preferred Embodiment

A second preferred embodiment of the present invention describes as an example a voltage converter in which the flying capacitor and the switch are partially configured in a common manner.

Figure 16:
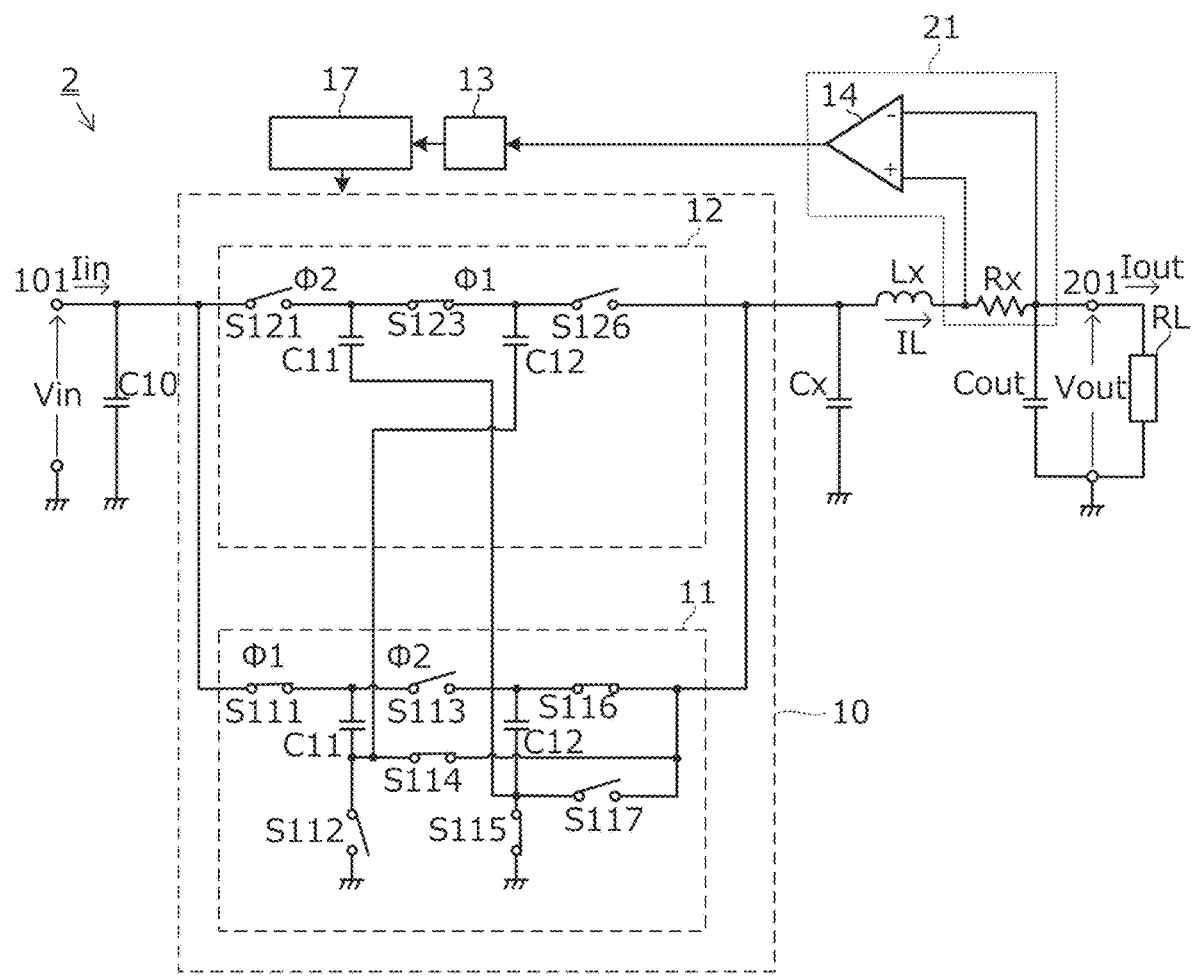
FIG. 16 is a circuit diagram of a voltage converter according to a second preferred embodiment of the present invention.

FIG. 16 is a circuit diagram of a voltage converter 2 according to the second preferred embodiment. Instead of being entirely configured in a duplicated manner, the voltage converter 2 is provided by a circuit partially configured in a duplicated manner to operate in an interleaved manner. As it can be seen in comparison to FIG. 2, the flying capacitor C10 is shared by the first capacitive voltage conversion circuit 11 and the second capacitive voltage conversion circuit 12. The intermediate capacitor Cx is also shared by the first capacitive voltage conversion circuit 11 and the second capacitive voltage conversion circuit 12. Because the switches S112, S114, S115, and S117 generate positive and negative pulses, these switches can be configured in a shared manner when the order of connecting the switches is appropriately changed.

Third Preferred Embodiment

A third preferred embodiment of the present invention describes as an example a voltage converter including an inductive converter.

Figure 17:
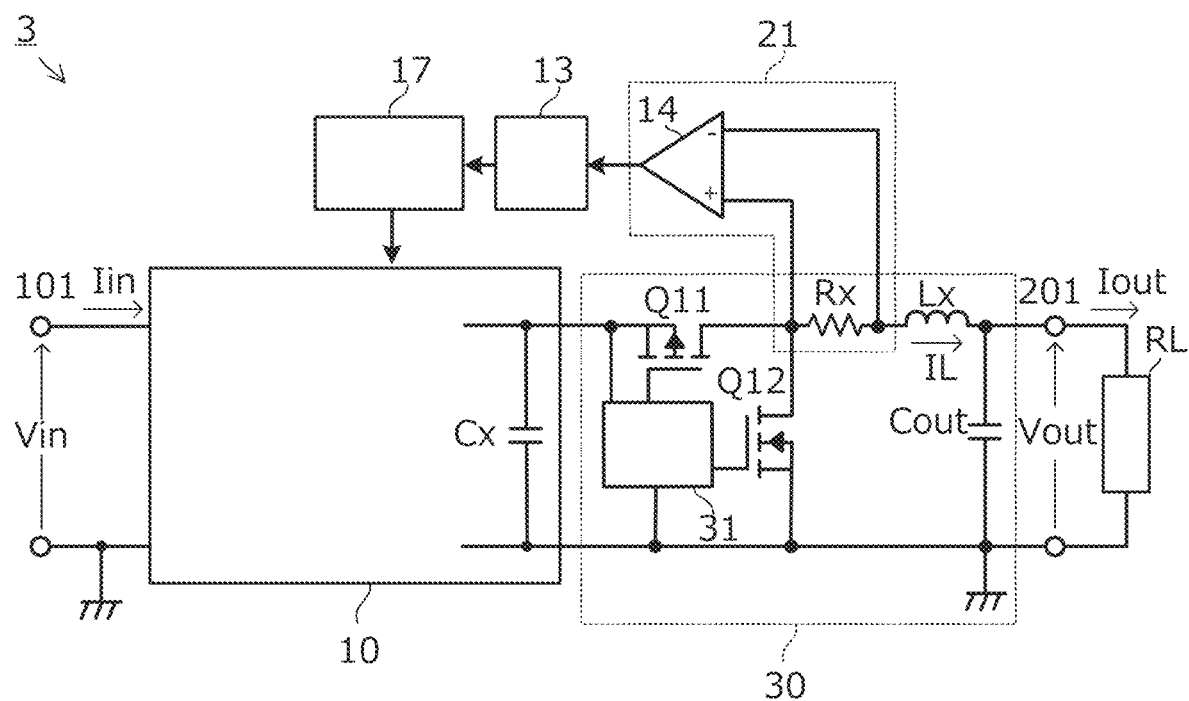
FIG. 17 is a block diagram of a voltage converter according to a third preferred embodiment of the present invention.

FIG. 17 is a block diagram of a voltage converter 3 according to the third preferred embodiment. In the present preferred embodiment, an inductive buck converter 30 is coupled in the subsequent stage after the capacitive voltage conversion circuit 10.

The inductive buck converter 30 includes a rectifier switch Q11, a commutator switch Q12, the inductor Lx, the capacitor Cout, and a driver 31. The rectifier switch Q11 is, for example, a p-type metal-oxide-semiconductor field-effect transistor (MOS-FET). The commutator switch Q12 is, for example, an n-type MOS-FET. The driver 31 provides switching of the rectifier switch Q11 and the commutator switch Q12 in an alternating manner. The buck converter 30 may be provided as a plurality of circuits coupled in parallel with each other, and the plurality of buck converters may operate in an interleaved manner.

Fourth Preferred Embodiment

A fourth preferred embodiment of the present invention describes as an example a voltage converter including a plurality of capacitive voltage conversion circuits and a voltage converter including main portions of a plurality of capacitive voltage conversion circuits.

Figure 18:
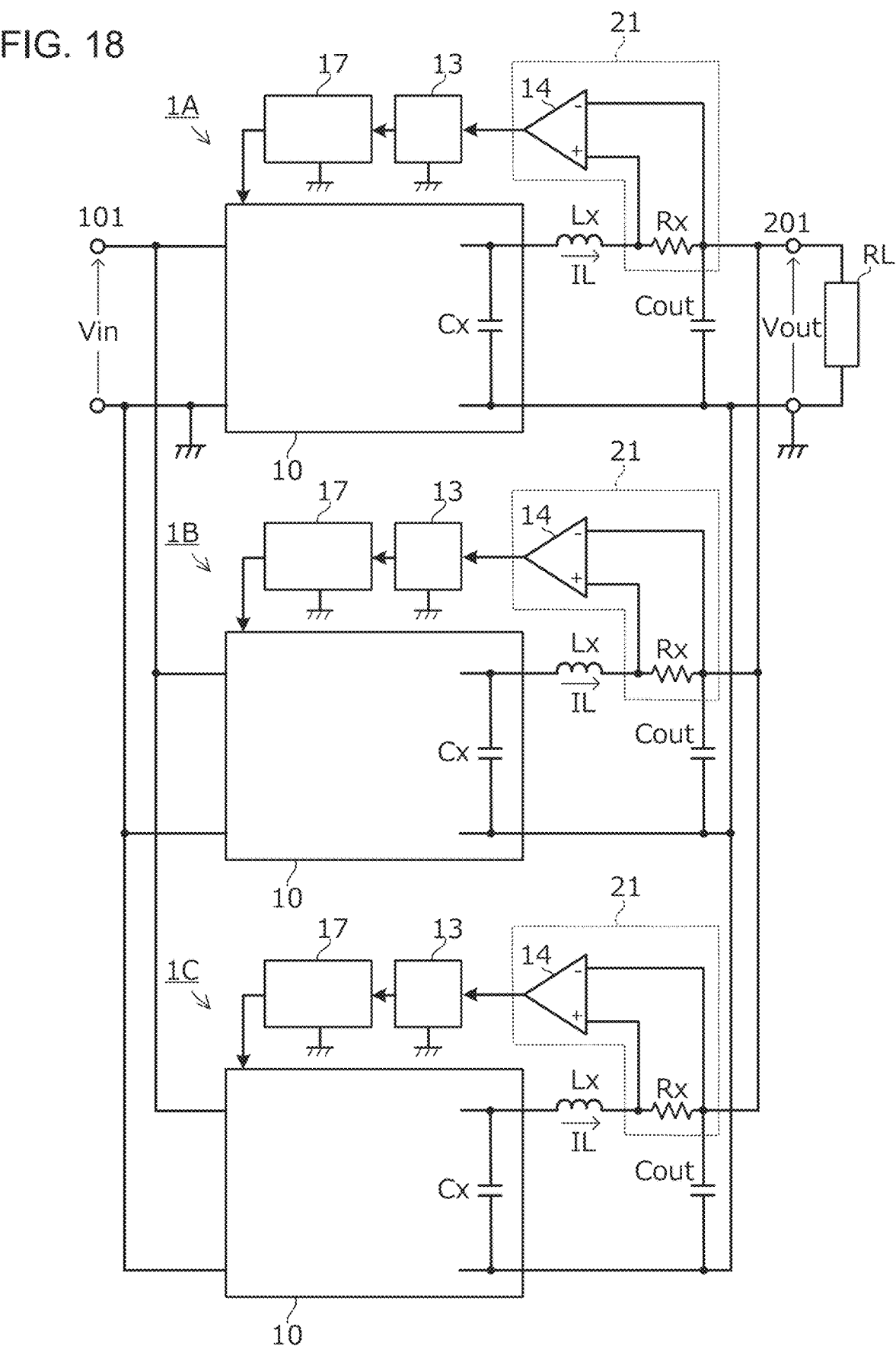
FIG. 18 is a block diagram of a voltage converter according to a fourth preferred embodiment of the present invention.

FIG. 18 is a block diagram of a voltage converter according to the fourth preferred embodiment. This voltage converter includes three voltage converters 1A, 1B, and 1C. The voltage converters 1A, 1B, and 1C each include the capacitive voltage conversion circuit 10, the voltage detector 13, the controller 17, the inductor Lx, and the output capacitor Cout.

The inputs of the three capacitive voltage conversion circuits 10 are coupled in parallel with each other. The input terminal 101 for the input voltage Vin is shared by the three capacitive voltage conversion circuits 10. The output capacitors Cout are coupled in parallel with each other. The output terminal 201 for the output voltage Vout is shared by the three capacitive voltage conversion circuits 10.

Also when the plurality of voltage converters 1A, 1B, and 1C are coupled in parallel with each other as described above, the current detector 21 of the voltage converter 1A detects the current IL flowing in the inductor Lx. Similarly, the current detector 21 of the voltage converter 1B detects the current IL flowing in the inductor Lx, and the voltage detector 13 of the voltage converter 1C, the current detector 21 of the voltage converter 1C detects the current IL flowing in the inductor Lx.

Here, if the voltage converters are each configured to change the state of switches in accordance with a result of comparing the output voltage Vout to the threshold voltage, and the threshold voltage varies among the voltage converters, only the voltage converter of a relatively high threshold voltage to be compared to the output voltage Vout is activated. This means that, with conventional configurations, because the common output voltage Vout of small ripple is detected, the ratio of load on the voltage converter of a relatively high threshold voltage increases, which destroys the balance among the plurality of voltage converters. If the comparator has no offset, the voltage converters provide switching at the same frequency, this is, however, not practical when the individual voltage converters are disposed in parallel with each other. Furthermore, when the capacitance of the capacitor varies among the capacitive voltage conversion circuits, the capacity of transmitting electric charges also varies, and as a result, the output current varies among the voltage converters.

In contrast, in the present preferred embodiment, not the common output voltage Vout but the current IL flowing in the inductor Lx of each voltage converter is detected and fed back (to control switching of the switches of the capacitive voltage conversion circuit 10), and thus, the converters parallelly operate in a well-balanced manner. Specifically, the voltage converters 1A, 1B, and 1C of the present preferred embodiment are separated from each other by the inductors Lx, and the current IL decreases at a speed based on the discharge rate determined by, for example, the flying capacitors, the intermediate capacitor Cx, and the resistance components of the switches of each of the voltage converters 1A, 1B, and 1C. Thus, the voltage converters 1A, 1B, and 1C coupled in parallel with each other can each operate at an optimum operating frequency with respect to its load by using a ripple voltage based on its characteristics. As a result, when the capacitance of the capacitor and the performance of voltage conversion differ among the voltage converters operating in parallel with each other, the balance of losses and heat can be established by using corresponding operating frequencies.

Figure 19:
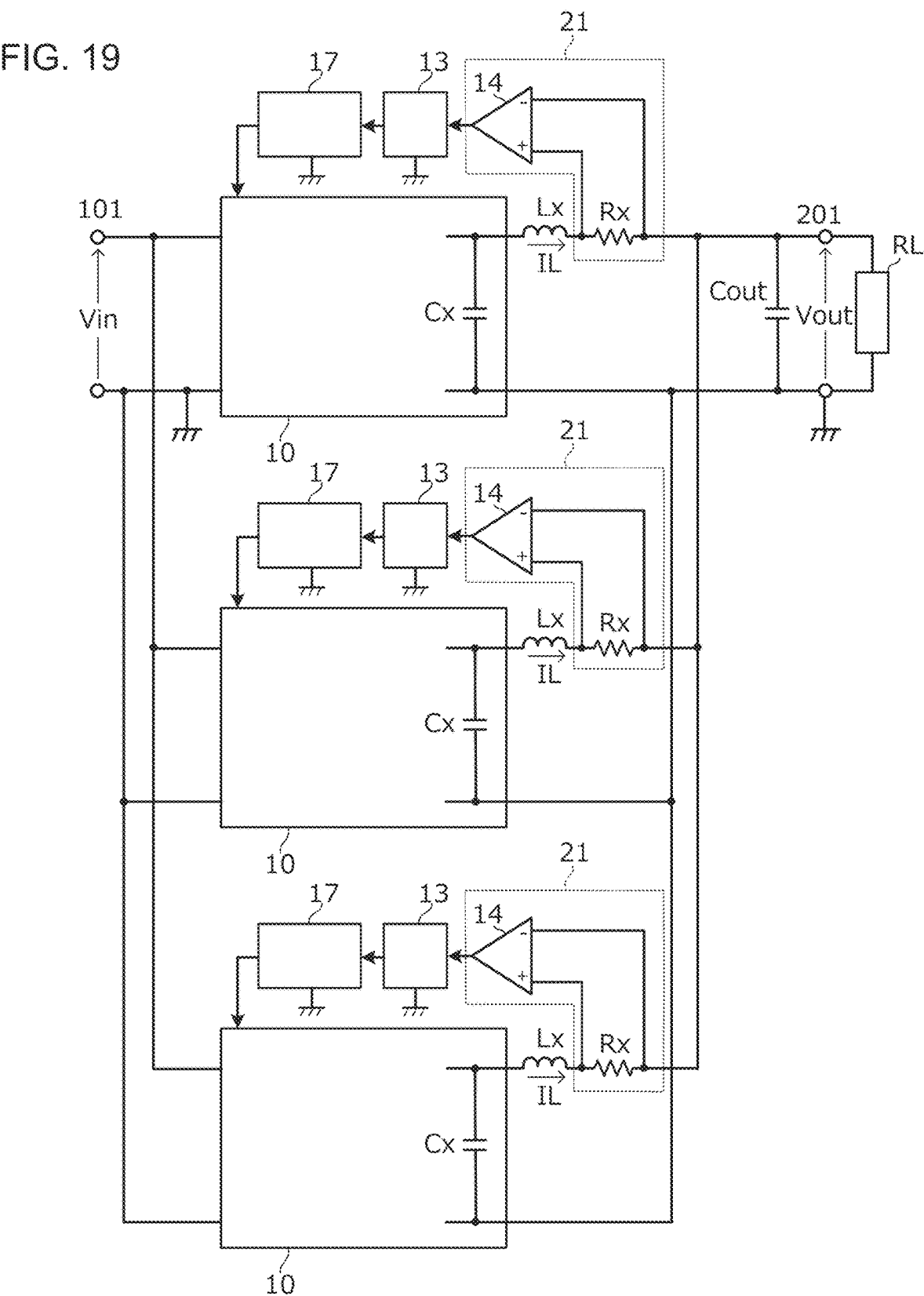
FIG. 19 is a block diagram of another voltage converter according to the fourth preferred embodiment of the present invention.

FIG. 19 is a block diagram of another voltage converter according to the present preferred embodiment. This voltage converter includes three capacitive voltage conversion circuits 10 configured to receive the input voltage Vin, convert the input voltage Vin into voltage, and output the voltage. The voltage converter also includes the single (common) output capacitor Cout and the inductors Lx coupled in series between the respective capacitive voltage conversion circuits 10 and the output capacitor Cout. The voltage converter also includes the current detectors 21, the voltage detectors 13, and the controllers 17 that are provided for the respective capacitive voltage conversion circuit 10.

The capacitive voltage conversion circuit 10 includes a plurality of switches, at least one flying capacitor, and the intermediate capacitor Cx provided at an output portion. The current detector 21 and the voltage detector 13 both detect the current IL flowing in the inductor Lx.

The controller 17 provided for each capacitive voltage conversion circuit 10 controls the switches provided for the capacitive voltage conversion circuit 10 by comparing the detection result of the voltage detector 13 to the threshold current so as to cause the switches to change between at least two kinds of states.

Also in the case of the voltage converter configured as illustrated in FIG. 19, not the common output voltage Vout but the current IL flowing in the inductor Lx of each voltage converter is detected and fed back (to control switching of the switches of the capacitive voltage conversion circuit 10), and thus, the voltage converter configured as illustrated in FIG. 19 achieves the same effects as the voltage converter illustrated in FIG. 18. Specifically, when the capacitance of the capacitor and the performance of voltage conversion differ among the voltage converters operating in parallel with each other, the balance of losses and heat can be established by using corresponding operating frequencies.

The examples in FIGS. 18 and 19 indicate voltage converters including three capacitive voltage conversion circuits 10, for example, but the number of the capacitive voltage conversion circuits 10 is not limited to this instance. When an even number of the capacitive voltage conversion circuits 10 are included, particular advantageous effects can be achieved with the following configuration: an even number of the capacitive voltage conversion circuits 10 are coupled in parallel with each other, the input terminal 101 for input voltage and the output terminal 201 for output voltage are shared by the capacitive voltage conversion circuits 10, the capacitive voltage conversion circuits 10 have at least a first connection state and a second connection state depending on the connection state of a plurality of switches, and a first resonant frequency determined by the intermediate capacitor, the output capacitor, and the inductor of the capacitive voltage conversion circuit 10 in the first connection state is equal or substantially equal to a second resonant frequency determined by the intermediate capacitor, the output capacitor, and the inductor of the capacitive voltage conversion circuit in the second connection state. This configuration facilitates control of the relationship between the resonant frequency and the switching frequency.

Fifth Preferred Embodiment

A fifth preferred embodiment of the present invention describes as an example a configuration in which the circuit to detect the current IL flowing in the inductor Lx is different from the circuit described above.

Figure 20:
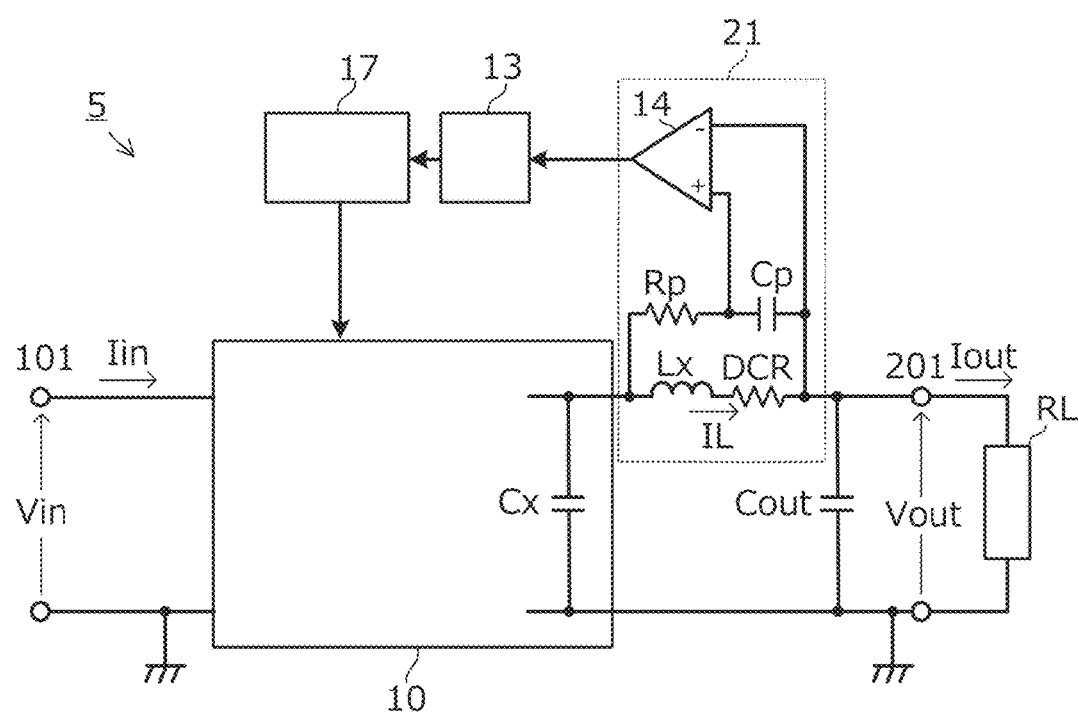
FIG. 20 is a block diagram of a voltage converter according to a fifth preferred embodiment of the present invention.

FIG. 20 is a block diagram of a voltage converter 5 according to the fifth preferred embodiment. The voltage converter 5 includes the capacitive voltage conversion circuit 10 configured to receive the input voltage Vin, convert the input voltage Vin into the output voltage Vout, and output the output voltage Vout. The voltage converter 5 also includes the output capacitor Cout, the intermediate capacitor Cx provided at an output portion of the capacitive voltage conversion circuit 10, the current detector 21, the voltage detector 13, and the controller 17.

The current detector 21 includes the inductor Lx and a direct-current resistance component DCR of the inductor Lx, which are coupled in series between the capacitive voltage conversion circuit 10 and the output capacitor Cout, and a series circuit including a resistor Rp and a capacitor Cp. The series circuit is coupled in parallel with a series circuit including the inductor Lx and the direct-current resistance component DCR. The differential amplifier circuit 14 detects a voltage across both ends of the capacitor Cp. The advantageous effects of the voltage detector 13 and the controller 17 are described in the first to fourth preferred embodiments.

In FIG. 20, the resistor Rp and the capacitor Cp are configured in accordance with following expression: (Expression 4) and as a result, the voltage across both ends of the capacitor Cp draws a waveform similar to the waveform of the current IL flowing in the inductor Lx.

$$Ep*Cp=Lx/DCR$$

Consequently, by detecting the voltage across the capacitor Cp, the current flowing in the inductor Lx can be detected.

Because in the present preferred embodiment, the resistor Rx is not inserted in series with the inductor Lx, it is possible to avoid power loss caused by the resistor Rx and voltage drop caused by the resistor Rx.

Other Preferred Embodiments

The above-described preferred embodiments of the present invention describe examples in which two Dickson circuits are coupled in parallel with each other and operate in an interleaved manner, but a single series-parallel charge pump circuit may be used, for example. Instead of single-phase or two-phase, for example, a multiphase capacitive voltage conversion circuit may be implemented.

The voltage converters described as the above preferred embodiments use the example in which a single inductor and a single capacitor defining the LC circuit 20 are included for ease of description. However, a plurality of inductors and a plurality of capacitors may be used. The above description is about the capacitive voltage conversion circuit 10 including a circuit board and chip components, but the capacitors of the capacitive voltage conversion circuit 10 may be partially or entirely disposed in a multilayer substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A voltage converter comprising:
a capacitive voltage conversion circuit to receive an input voltage, convert the input voltage into an output voltage, and output the output voltage;
an output capacitor;
an inductor coupled in series between the capacitive voltage conversion circuit and the output capacitor;
a current detector; and
a controller; wherein
the capacitive voltage conversion circuit includes a plurality of switches, at least one flying capacitor, and an intermediate capacitor provided at an output portion;
the current detector is configured to detect a current flowing in the inductor;
the controller is configured or programmed to control the plurality of switches to change between at least two states by comparing the current flowing in the inductor to a threshold current; and
the inductor is coupled in series between the intermediate capacitor and the output capacitor.

2. The voltage converter according to claim 1, wherein the current detector includes a resistor coupled in series with the inductor and a voltage detection circuit to detect a drop voltage in the resistor.

3. The voltage converter according to claim 1, wherein the current detector includes:
a series circuit including a resistor and a capacitor, the series circuit being coupled in parallel with the inductor; and
a voltage detection circuit to detect a voltage across both ends of the capacitor or a voltage across both ends of the resistor.

4. The voltage converter according to claim 1, wherein a detection value detected by the current detector or the threshold current is determined to set a switching frequency within a range of a minimum frequency to a maximum frequency, the switching frequency of the switches being generated when the switches are changed between the at least two states by comparing the current flowing in the inductor to the threshold current.

5. The voltage converter according to claim 1, wherein the threshold current is less than 0.

6. The voltage converter according to claim 1, wherein the controller is configured or programmed to change a state of the switches when a predetermined time elapses after the current flowing in the inductor reaches 0.

7. The voltage converter according to claim 1, wherein the current flowing in the inductor is within a range of about 0.1 A to about 5 A.

8. The voltage converter according to claim 1, wherein the capacitive voltage conversion circuit includes a first capacitive voltage conversion circuit and a second capacitive voltage conversion circuit coupled in parallel with each other.

9. The voltage converter according to claim 8, wherein each of the first and second capacitive voltage conversion circuits includes a plurality of the flying capacitors.

10. The voltage converter according to claim 8, wherein the intermediate capacitor is shared by the first and second capacitive voltage conversion circuits.

11. The voltage converter according to claim 1, wherein an inductive buck converter is coupled with the capacitive voltage conversion circuit.

12. The voltage converter according to claim 11, wherein the conductive buck converter includes a rectifier switch, a commutator switch, and a driver.

13. The voltage converter according to claim 12, wherein the rectifier switch is a p-type metal-oxide-semiconductor field-effect transistor.

14. The voltage converter according to claim 12, wherein the commutator switch is an n-type metal-oxide-semiconductor field-effect transistor.

15. The voltage converter according to claim 12, wherein the driver is configured to alternately switch between the rectifier switch and the commutator switch.

* * * * *